3,135,768
ESTERS OF 4,7-DIHYDRO-1,3-DIOXEPIN-2-ACETIC ACID

Chester E. Pawloski, Bay City, and George B. Sterling, Midland, Mich., assignors to The Dow Chemical Company, Midland, Mich., a corporation of Delaware
No Drawing. Filed Mar. 14, 1962, Ser. No. 179,800
2 Claims. (Cl. 260—338)

The present invention is concerned with dioxepins corresponding to the formula

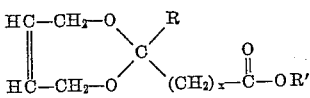

wherein R represents hydrogen or a lower alkyl group, $x$ is either zero or an integer having a value of from 1 to 5, and R' represents a lower alkyl group. These compounds are liquid materials which are somewhat soluble in common organic solvents and of low solubility in water. They are useful as parasiticides, being of particular use in the control of ticks.

The novel dioxepin compounds are prepared by the reaction of an ester of a keto acid with 2-butene-1,4-diol. The reaction is preferably carried out in the presence of a dialkoxy alkane which suitably may be 2,2-dimethoxybutane, 2,2-dibutoxypropane, 2,2-dimethoxypropane, 3,3-dimethoxypropane, dimethoxycyclohexane and the like. The reaction is catalyzed by a small amount of an acid catalyst such as phosphoric acid, chloroacetic acid, sulfuric acid, benzenesulfonic acid and the like.

The butenediol and the ester of the keto acid are preferably employed in substantially equimolar amounts. When employing the dialkoxy alkane, it is advantageously used in an amount about equimolecular with the ester. The reaction preferably is carried out in an organic liquid as a reaction medium, although this may be dispensed with if desired. The reaction readily takes place at temperatures of from about 10° C. to about 100° C. In carrying out the reaction the butenediol, the ester of the keto acid and the dialkoxyalkane are mixed together with a catalytic amount of the acid catalyst and the resulting mixture is kept for a relatively short period in the reaction temperature range. Upon completion of the reaction, organic solvent liquid, if employed, is stripped from the mixture and the balance of the mixture is fractionally distilled under reduced pressure to obtain the desired product.

The invention is illustrated by the following non-limiting examples, in which, unless otherwise stated, all parts and percentages are given on a weight basis.

Example 1

Into a reaction vessel there was charged a mixture of 88 parts of 2-butene-1,4-diol, 104 parts of 2,2-dimethoxypropane, 130 parts of ethyl acetoacetate and 180 parts of benzene. Into this reaction mixture, which was at ambient temperature, there was stirred 0.1 part of sulfuric acid. An endothermic reaction ensued, characterized by transition of the two phase reaction mixture into a single phase liquid product. A fractionating column was fitted to the reaction vessel and the mixture was distilled at a reflux ratio of 2/1 until the pot temperature reached 100° C. The pot residue was allowed to cool to ambient temperature. After addition to the material of 2 parts of sodium carbonate, distillation was continued under vacuum. There were obtained 132 parts of a clear liquid, B.P. 130° C./10 mm., $n_D^{25}$ 1.4578. The carbon and hydrogen content of the product were 59.76 percent and 8.35 percent respectively, while the theoretical values, based on the formula

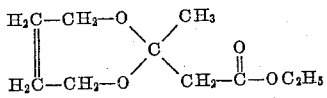

were 59.98 and 8.05.

Example 2

In a manner comparable to the above, the following dioxepins were prepared from the indicated reaction mixtures (a) Methyl ester of 4,7-dihydro-2-methyl-1,3-dioxepin-2-acetic acid from 2-butene-1,4-diol, methyl acetoacetate and 2,2-dimethoxypropane.

(b) Butyl ester of 3(4,7-dihydro-1,3-dioxepin-2-yl)-propionic acid from 2-butene-1,4-diol and butyl levulinate.

The new compounds of the present invention have been found to be useful as parasiticides. For parasiticidal use, the materials may be dispersed on a finely divided solid and employed as dusts. They may also be dispersed in water with the aid of a wetting agent and the resulting aqueous suspension employed as a spray. In representative operations, aqueous compositions containing 1 part per million of the ethyl ester of 4,7-dihydro-2-methyl-1,3-dioxepin-2-acetic acid give a 100 percent kill of lone star ticks.

What is claimed is:
1. A dioxepin having the formula

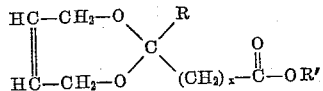

wherein R is a member of the group consisting of hydrogen and lower alkyl, R' is lower alkyl and $x$ has a value of from 0 to 5.

2. The ethyl ester of 4,7-dihydro-2-methyl-1,3-dioxepin-2-acetic acid.

No references cited.